United States Patent [19]

Dickey et al.

[11] 4,421,409
[45] Dec. 20, 1983

[54] OPEN AREA RATIOMETER

[75] Inventors: Fred M. Dickey, Derby; Darrell M. Postlethwaite, Wichita, both of Kans.

[73] Assignee: The Boeing Company, Seattle, Wash.

[21] Appl. No.: 196,689

[22] Filed: Oct. 14, 1980

[51] Int. Cl.³ .............................................. G01B 9/02
[52] U.S. Cl. .................................... 356/354; 356/379
[58] Field of Search ................... 356/354, 355, 379; 350/162 SF; 250/550

[56] References Cited

PUBLICATIONS

Chapman et al., "A Fourier Transform Method for the Verification of Wire Screens for Standard Sieves", *J. Phys. E. Sci. Instrum.*, vol. 10, No. 6, pp. 621–626, 6/77.
Dickey et al., "Optical Open-Area Ratiometer", *SPIE*, vol. 220, Optics in Metrology and Quality Assurance, pp. 82–88, 1980.

*Primary Examiner*—William L. Sikes
*Assistant Examiner*—Matthew W. Koren
*Attorney, Agent, or Firm*—Edwin H. Crabtree

[57] ABSTRACT

An optical apparatus and method for measuring the percent of open area of a perforated sheet. The apparatus and method based on Fourier optics uses a light detector which measures only a small central portion of the light in a Fraunhofer diffraction pattern of the perforated sheet. The ratiometer offers both accuracy and speed in the measuring of the percent of open area while avoiding diffraction problems which are characteristic with arrays of small holes in the perforated sheet. Also, the invention can be used with both opaque and translucent materials.

7 Claims, 5 Drawing Figures

OPEN AREA RATIOMETER

BACKGROUND OF THE INVENTION

This invention relates generally to a test apparatus and method for measuring the open area in a perforated sheet and more particularly but not by way of limitation to a ratiometer for measuring the open area in a perforated sheet used in accoustical dampening application for jet engine nucelles.

In jet engine nacelle construction perforated materials with arrays of small holes therein are now used to suppress noise from the engine. The design parameters which determine the accoustic characteristics of the perforated sheet can be related to the percent of open area i.e. the geometrical area of the holes per unit area of material. For opaque materials with large holes and large hole spacing, the percent of open area can be readily determined by measuring the light transmitted by the material. More recently, accoustic research has led to new sound suppression system components wherein the perforated translucent sheet material includes dense arrays of small holes. Typically the hole diameters are in the range of 0.004 to 0.008 inches and the percent of open area is nominally a few percent. For these conditions, there are two problems which are encountered utilizing light transmission measurement of the percent open area. One of these problems is that the small closely spaced holes produced a broad diffraction pattern which heretofore required a large area optical detector with uniform responsivity. The second problem is that such a large area detector used to respond to the diffraction pattern would respond to a significant amount of the light diffusely transmitted through the substrate. The optical apparatus and method as described herein eliminates the above-described problems.

Also, prior art open area ratio measurement techniques were generally unsatisfactory and consisted of a method of using scale measurements of the open area and mathematical calculations which produce a theoretical value rather than an actual value. Also, the open area ratio may be obtained using an airflow measuring system. The airflow system used large fixed laboratory equipment which is tedious to use, does not give real time results, and utilizes some approximations which inherently produces uncertainty in the results. Both of the above methods of measuring the open area are highly dependent on operator skill level, they are time consuming during the manufacturing of the perforated sheets used in jet engine nacelle construction.

U.S. Pat. No. 2,829,823 to Fedder, U.S. Pat. No. 3,162,713 to Koester, et al, U.S. Pat. No. 4,124,301 to Pocock, U.S. Pat. No. 4,090,793 to Lebbuska, U.S. Pat. No. 1,317,749 to Aldice, U.S. Pat. No. 3,636,362 to Beeman, et al, U.S. Pat. No. 3,918,815 to Gadbois, U.S. Pat. No. 3,316,411 to Linderman, U.S. Pat. No. 3,467,827 to Caseber and U.S. Pat. No. 3,954,337 to Ragland, Jr. all disclose state of the art equipment and methods of determining aperture size, perforations in sheets or materials having a plurality of apertures therein. None of the inventions described in these prior art patents specifically disclose the unique features of measuring only a small central portion of the diffracted light in a Fraunhofer diffraction pattern to determine the overall open area of a perforated sheet.

SUMMARY OF THE INVENTION

The open area ratiometer as described herein is portable, accurate, gives real time results, is simple to use, and is applicable to in-process control.

The subject invention eliminates the need of using laboratory equipment which inherently is inaccurate, does not produce real time results, and cannot be used for process control.

The ratiometer provides a direct reading eliminating the need of time-consuming theoretical mathematical calculations for determining the ratio of the open area in a perforated sheet. The invention provides a rapid reliable method of measuring the open area ratio of perforated sheet used in accoustical dampening applications. Also, the invention may be used with different types of material having perforations both in opaque and translucent substrates.

The improved ratiometer based on Fourier optics has been developed to determine the percent of open area by measuring only a selected portion of light in a diffraction pattern of an array of holes in the sheet material. The diffused light components transmitted through the substrate is effectively eliminated by using a small aperture plate associated with a light detector.

The apparatus and method of measuring the percent of open area offers accuracy and speed while avoiding diffraction problems associated with an array of small holes in a perforated sheet.

The open area ratiometer includes a laser light source for directing a light outwardly therefrom. A first optical lens and a second optical lens in association with a first aperture plate and a second aperture plate are used for collimating the light from the light source. A light diffraction optical lens is disposed in front of the second optical lens and in a spaced relationship from the second lens so that the perforated sheet can be received therebetween. A relay magnifying optical lens is disposed in front of the light diffraction lens for receiving and magnifying the diffracted light. A light diffraction aperture plate is disposed in front of the relay magnifying optical lens for receiving the magnified diffracted light. The size of aperture in the light diffraction aperture plate is small enough to receive only a small central portion of the diffracted light. A first light detector is mounted in front of the light diffraction aperture plate for receiving the small center portion of the diffracted light. Electronic means is electrically connected to the first light detector for receiving and measuring electrically the amount of diffracted light of the small center portion and converting electronically this amount to a percent of open area in the perforated sheet.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
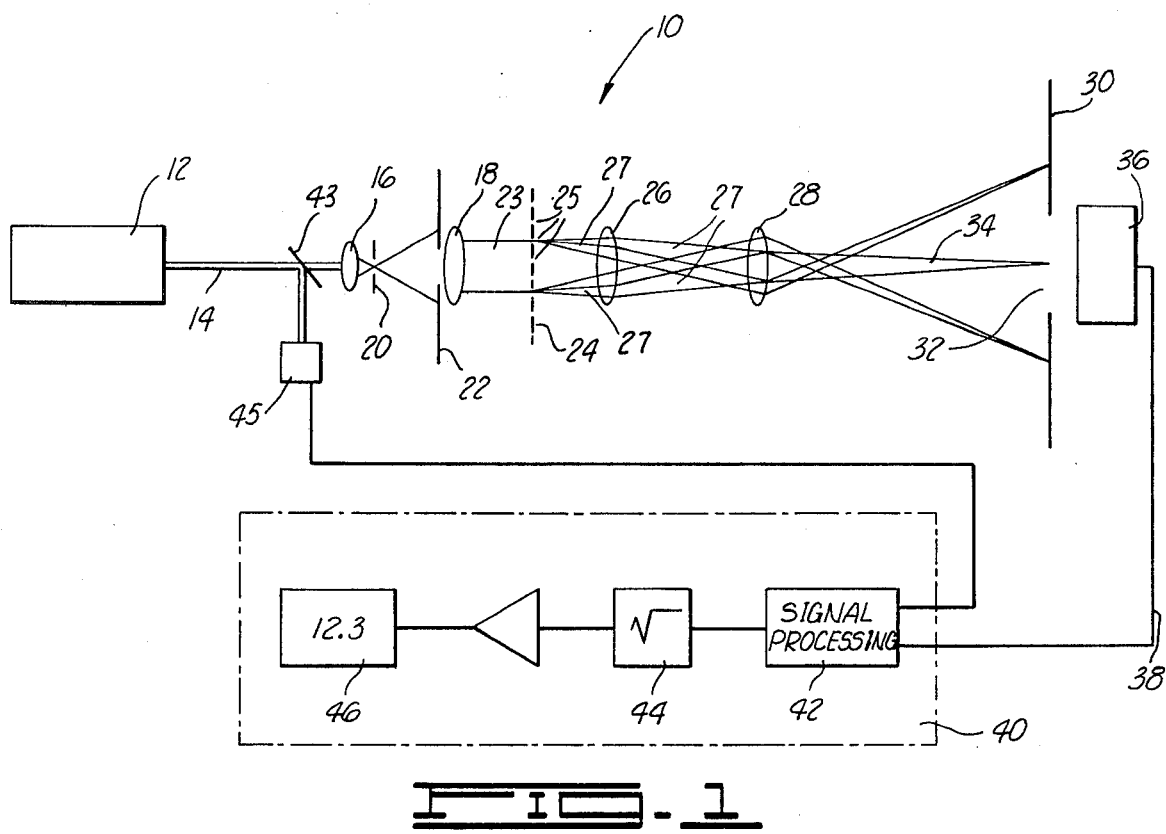
FIG. 1 is a diagram of the improved open area ratiometer for measuring a small center portion of the open area in a perforated sheet.

In FIG. 1 a diagram of an improved optical open area ratiometer is shown and designated by general reference numeral 10. The ratiometer 10 includes a quasi-monochromatic light source which in use may be a laser 12. The laser 12 directs a light source 14 outwardly therefrom where it is received by a standard laser collimator made up of a first collimating optical lens 16, a second collimating optical lens 18, a first aperture plate 20 and a second collimating aperture plate 22. The second aperture plate 22 determines the size of a collimated beam 23 from the light beam 14. A perforated sheet 24 having a plurality of apertures 25 therein is received in front of the second lens 18 and in a spaced relationship thereto. A light diffraction optical lens 26 is disposed in front of the sheet 24 and in a spaced relationship thereto for receiving a diffracted light 27 transmitted through the apertures 25 in the sheet 24. A relay magnifying optical lens 28 receives the diffracted light 27 from the lens 26 and magnifies the diffracted light 27 for receipt on a light diffraction aperture plate 30. The light diffraction aperture plate 30 has an aperture 32 therein which is small enough to receive only a small central portion 34 of the light 27 therethrough where it is received and measured by a first light detector 36. The first light detector 36 via an electrical lead 38 transmits the measured light received to a solid state electronic housing 40 where it is electronically processed by a signal processor 42 in combination with a square root function 44. The amount of open area in the sheet 24 is displayed in a housing face 46 and is expressed as a percent open area (i.e. POA). In FIG. 1 the POA is 12.3 percent.

A beam splitter 43 and a second light detector 45 are connected to the housing 40 through electrical lead 47 and are used for monitoring the light beam 14 and compensating for laser power variations from the laser 12.

Figure 2:
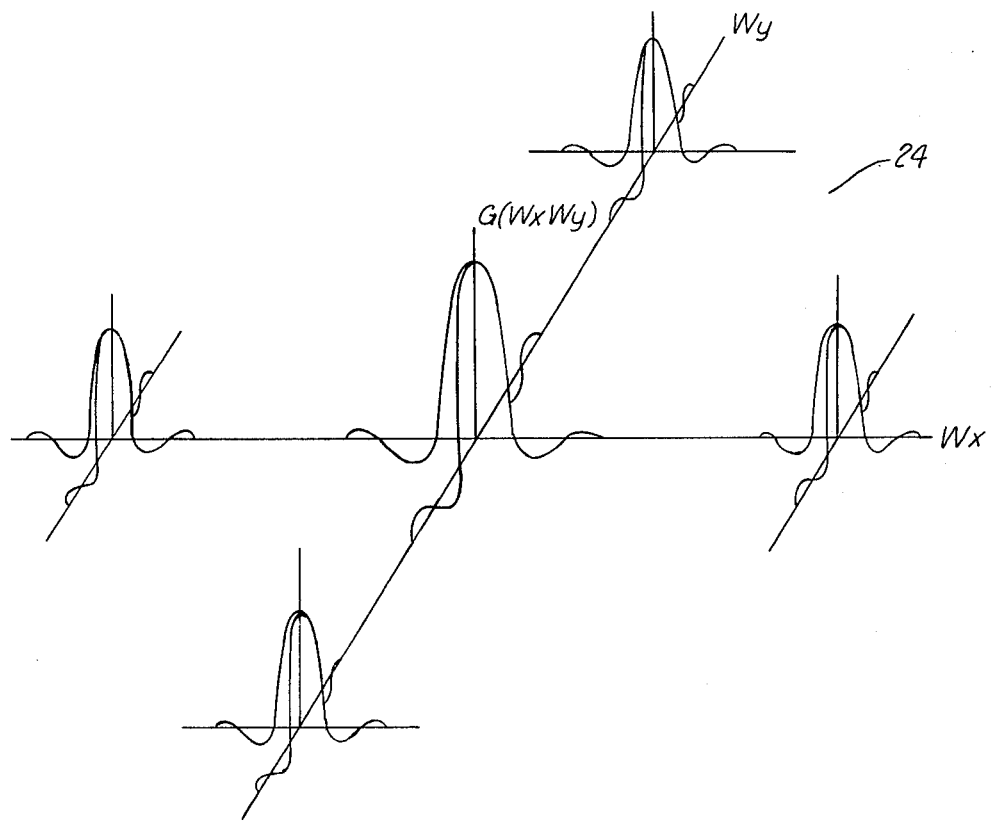
FIG. 2 illustrates an example of an optical diffraction pattern received through the perforated sheet and represented graphically.

In FIG. 2 the spatial frequencies of the diffracted light pattern is shown transmitted through the perforated sheet 24. This figure will be discussed further under the theory of the improved open area ratiometer 10.

Figure 3A:
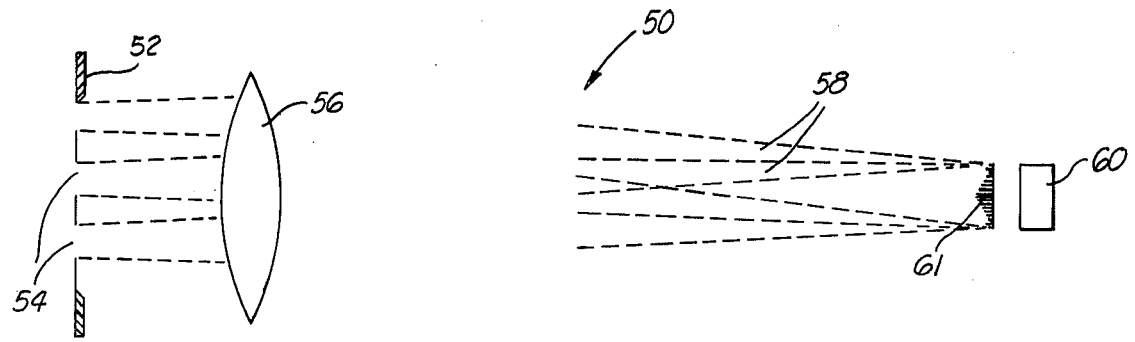
FIG. 3A illustrates a prior art open area ratiometer using a large area detector for measuring a relatively small diffraction pattern.

FIG. 3A illustrates a prior art open area ratiometer 50 having a perforated sheet 52 wherein the diffracted light from an array of large apertures 54 in the sheet 52 are received on a light diffraction lens 56. In this example, there is a relatively small diffraction pattern 58 which is received by a large area light detector 60. The inherent problems with this prior art device 50 is that the large area light detector 60 detects almost all of the light in the diffraction pattern 58 and if the substrate material of the perforated sheet 52 is translucent, the large detector 60 would collect too much of the diffused transmitted light, thereby providing an incorrect reading of the POA. Also, the large light detector 60 represents an additional problem in that it has a non-uniformity of response over the diffused light pattern 58. In this figure the Fraunhofer diffraction pattern can be seen and indicated by numeral 61.

Figure 3B:
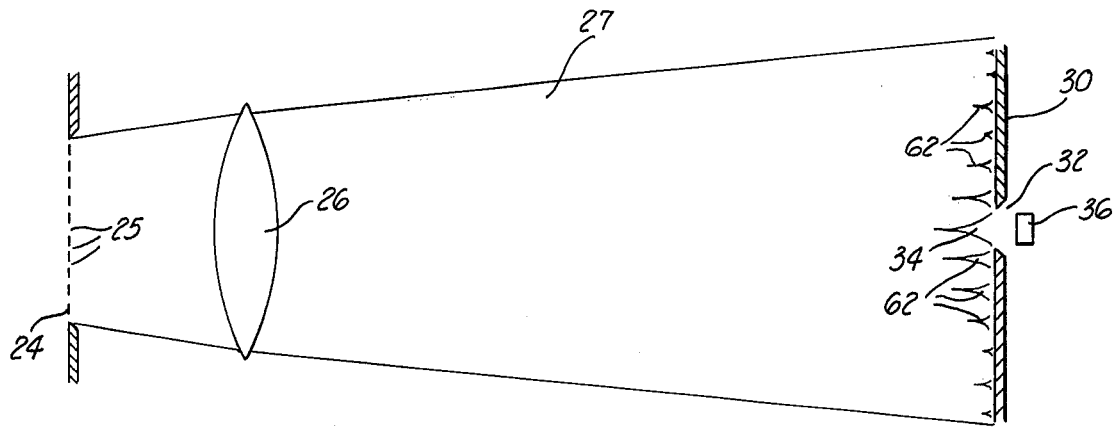
FIG. 3B illustrates the improved open area ratiometer having a small light detector in combination with a light diffraction aperture plate used for measuring only a small central portion of the diffracted light.

In FIG. 3B a portion of the improved open area ratiometer 10 is illustrated showing how the small detector 36 receives only the small central portion 34 of the diffracted light 27 through the aperture 32 of the light diffraction aperture plate 30. The light detector 36 does not attempt to collect all the light transmitted through the apertures 25 in the perforated sheet 24, but only the small central portion 34. Further, the small central portion 34 of the diffraction pattern 27 has all the information necessary to determine the POA and does not collect a significant amount of diffused transitted light. In this figure the Fraunhofer diffraction pattern of light from the apertures 25 can be seen and indicated by numeral 62.

Figure 4:
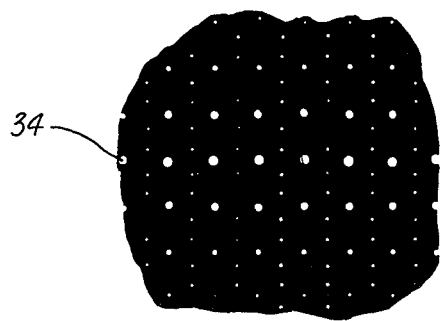
FIG. 4 illustrates a typical diffraction pattern for a quasi-periodic array in the perforated sheet.

In FIG. 4 a typical diffraction pattern of a quasi-periodic array is disclosed. By measuring the small central portion 34 of the diffracted light 27, the necessary POA can be determined in the perforated sheet 24.

THEORY

The optical open area ratiometer 10 shown in FIG. 1 is based on the properties of the Fourier transform of the light transmitted through the perforated sheet 24. The needed Fourier transform can be realized at the focal plane of a lens.[1] If $f(x,y)$ is an amplitude transmission function representing the perforated material, the light amplitude distribution at the focal plane of the lens is given by $$E(x',y') = c \int \int f(x,y) e^{-i(w_x x + w_y y)} dx dy, \qquad (1)$$

where c is a constant and $$w_x = \frac{2\pi}{\lambda f} x'$$

$$w_y = \frac{2\pi}{\lambda f} y'$$

$\lambda$ = wavelength
f = focal length
x',y' = focal plane coordinates

The transmission function is real and has a value of unity over the perforation and zero elsewhere. If Equation (1) is evaluated at $w_x = w_y = 0$, we have $$E(o,o) = c \int \int f(x,y) dx dy \qquad (2)$$

which is proportional to the open area of the perforated sheet 24. A ratiometer based on the above equation would, however, require the use of a light detector with an extremely small active area to just sample the DC component of the diffraction pattern. The performance of the ratiometer would be extremely sensitive to vibrations, alignment and aberrations in the optical elements.

The improved ratiometer 10 which has been developed and described under FIG. 1 takes advantage of the fact the aperture pattern in the perforated sheet 24 is periodic or quasi-periodic and allows the use of the detector 36 through the following approach: Lenses 16 and 18 and aperture plates 20 and 22 form a standard laser collimator. Aperture plate 22 determines the size of the collimated beam illuminating the perforated sheet 24. The light amplitude distribution at the focal plane of the light diffraction optical lens 26 is proportional to the Fourier transform of the amplitude transmission function of the perforated sheet 24 per Equation (1). Relay magnifying optical lens 28 images the diffraction pattern with magnification on light diffraction aperture plate 30. Light transmitted through aperture 32 in plate 30 is detected by light detector 36 and the detector output is electronically processed to provide a correct read out of the POA. Except for the square root function 44 which is part of the electronic control housing 40, the electronic processing is a typical compensated meter drive output. The purpose of the square root function 44 will become apparent in the following discussion.

For a periodic array of holes in the perforated sheet 24 the transmission function can be represented as a two-dimensional Fourier series as $$f(x,y) = \sum_{-\infty}^{\infty} \sum_{-\infty}^{\infty} C_{mn} e^{i2\pi(\frac{mx}{X} + \frac{ny}{Y})} \quad (3)$$

$$C_{mn} = \frac{1}{XY} \int_X \int_Y f(x,y) e^{-i2\pi(\frac{mx}{X} + \frac{ny}{Y})} dx dy.$$

Where X and Y are respectively the periods of the array in the x and y coordinate system. It should be noted that $C_{oo}$ is the average value of the transmission function over the X Y cell which is the fractional open area of the perforated sheet 24. Expressed in percent, the POA is given by $$POA = C_{oo} \times 100. \quad (4)$$

The Fourier transform f(x,y) can be determined from Equation (3) in terms of generalized functions as $$F(w_x, w_y) = (2\pi)^2 \sum_{-\infty}^{\infty} \sum_{-\infty}^{\infty} C_{mn} \delta\left(w_x - \frac{2\pi m}{X}, w_y - \frac{2\pi n}{Y}\right). \quad (5)$$

In FIG. 1 the perforated sheet 24 is illuminated by a finite beam of a diameter D. The amplitude distribution function b(x,y) for such a beam is given by $$b(x,y) = \text{circ}\left(\frac{\sqrt{x^2 + y^2}}{D/2}\right). \quad (6)$$

Equation 6 has a Fourier transform given by $$B(w_x, w_y) = \frac{D^2}{4} \frac{J_1\left(\frac{D}{2}\sqrt{w_x^2 + w_y^2}\right)}{\frac{D}{2}\sqrt{w_x^2 + w_y^2}}, \quad (7)$$

which is the well-known Airy pattern. The light amplitude g(x,y) transmitted by the perforated material is $$g(x,y) = b(x,y) f(x,y). \quad (8)$$

The corresponding Fourier transform of g(x,y) is obtained using the convolution theorem as The approximation in the second line in Equation (9) is based on the requirement that a large number of holes must be obtained in the beam for a well-defined measurement of the POA. For this case, D X,Y and the width of the Airy pattern is small compared to the separation of the delta functions in Equation (5). The low frequency terms of Equation (9) are represented graphically in FIG. 2.

The determination of the POA is accomplished by taking the ratio R, of the power in the central diffraction spot of the perforated sheet 24 to the power in the light source 14. This ratio is just the integral of the square of Equation (9) divided by the integral of the square of Equation (7) over the same limits. For approximations and conditions described above the ratio is, $$R = \frac{\int\int |G(w_x, w_y)|^2 dw_x dw_y}{\int\int |B(w_x, w_y)|^2 dw_x dw_y} = C_{oo}^2,$$

where the integrals are over the clear area of the aperture. The square root of R is then the desired result. In Equation (10) it is assumed the detector is linear with optical power, a condition that can be realized over a considerable dynamic range.

It is the relative large size of the effective detector area determined by aperture plate 30 that is responsible for the advantages of the apparatus and method as described herein. The aperture 32 is chosen to limit the light 27 received by the detector 36 to that in the small central portion 34. However, based on the above discussion, the aperture size 32 can still be made large with respect to the width of the central term of the diffraction pattern and not intercept light from other parts of the diffraction pattern. It is this circumstance that makes the ratiometer 10 insensitive to vibrations and alignment. Also modest aberration in the lenses do not significantly spread the energy distribution in the small central portion 34.

So far the analysis has addressed perforated materials with opaque substrate. The translucent aspect of any substrate materials can be treated by writing the transmission function as $$f'(x,y) = f(x,y) + n(x,y) \quad (11)$$

where f(x,y) is a function previous defined and n(x,y) is a term representing the material transmittance exclusive of the hole pattern. That is, n(x,y) is zero over the area of the holes. Due to the random nature of diffuse scattering n(x,y) represents a random process with a wide spatial spectrum. Thus, a negligible amount of the power represented by n(x,y) is received by the detector 36 because of the small effective spatial spectrum width of the aperture 32 in front of the detector 36.

The open area ratiometer 10 for measuring the POA of a perforated sheet such as sheet 24 is repeatable and can be calibrated for accurate and rapid production $$G(w_x, w_y) = B(w_x, w_y) * F(w_x, w_y) \cong \frac{D^2}{4} \sum_{-\infty}^{\infty} \sum_{-\infty}^{\infty} C_{mn} \frac{J_1\left(\frac{D}{2}\sqrt{\left(w_x - \frac{2m}{X}\right)^2 + \left(w_y - \frac{2n}{Y}\right)^2}\right)}{\frac{D}{2}\sqrt{\left(w_x - \frac{2m}{X}\right)^2 + \left(w_y - \frac{2n}{Y}\right)^2}} \quad (9)$$

quality control inspection. This apparatus is relatively inexpensive and simple to implement.

REFERENCES

1. J. W. Goodman, *Introduction to Fourier Optics,* McGraw-Hill, New York 1968.
2. W. Budde, "Multidecade Linearity Measurements on Si Photodiodes", *Applied Optics,* Vol. 18, No. 10, 15, May, 1979.

Changes may be made in the construction and arrangement of the parts or elements of the embodiments as described herein without departing from the spirit or scope of the invention defined in the following claims.

What is claimed is:

1. An improved apparatus for optically measuring the percent of open area in a perforated sheet, the apparatus comprising:
    a quasi-monochromatic light source for directing a light outwardly therefrom;
    means for collimating the light received from the light source and disposed in front of the light source;
    a light diffraction optical lens disposed in front of and in a spaced relationship from the light collimating means so the perforated sheet can be received therebetween, the lens receiving diffracted light which is passed through the perforations in the perforated sheet;
    a relay magnifying optical lens disposed in front of the light diffraction lens for receiving and magnifying the diffracted light therefrom;
    a light diffraction aperture plate disposed in front of the relay magnifying lens for receiving the magnified diffracted light therefrom, the size of the aperture in the light diffraction aperture plate being small enough to receive only a small central portion of the diffracted light from the perforated sheet;
    a first light detector mounted in front of the aperture in the light diffraction aperture plate for receiving the small central portion of the diffracted light received therethrough; and
    electronic means electrically connected to the first light detector for receiving and measuring electrically the amount of diffracted light of the small center portion and converting electronically this amount to a percent of open area in the perforated sheet.

2. The apparatus as described in claim 1, further including a beam splitter disposed between the light source and means for collimating the light and a second light detector electrically connected to the beam splitter and the electronic means, the splitter and the second light detector used for monitoring and compensating for power variations from the light source.

3. An improved apparatus for optically measuring the percent of open area in a perforated sheet, the apparatus comprising:
    a quasi-monochromatic light source for directing a light outwardly therefrom;
    a first collimating optical lens disposed in front of the light source and receiving the light therethrough;
    a first collimating aperture plate disposed in front of the lens and receiving the light therethrough;
    a second collimating aperture plate disposed in front of the first plate and receiving the light therethrough;
    a second collimating optical lens disposed in front of the second plate and receiving the light therethrough;
    the first and second lense and the first and second plate collimating the light from the light source;
    a light diffraction optical lens disposed in front of and in a spaced relationship from the second lens so the perforated sheet can be received therebetween, the light diffraction lens receiving the diffracted light which is passed through the perforations in the perforated sheet;
    a relay magnifying optical lens disposed in front of the light diffraction lens for receiving and magnifying the diffracted light therefrom;
    a light diffraction aperture plate disposed in front of the relay magnifying optical lens for receiving the magnified diffracted light therefrom, the size of the aperture in the light diffraction aperture plate small enough to receive only a small center portion of the diffracted light from the perforated sheet;
    a first light detector mounted in front of the aperture in the light diffraction aperture plate for receiving the small center portion of the diffracted light received therethrough; and
    electronic means electrically connected to the first light detector for receiving and measuring electrically the amount of diffracted light of the small center portion and converting electronically this amount to a percent of open area in the perforated sheet.

4. The apparatus as described in claim 3 wherein the light source is a laser.

5. The apparatus as described in claim 4 further including a beam splitter disposed between the laser and the first collimating optical lens and a second light detector connected to the beam splitter and the electronic means, the splitter and second light detector used for monitoring and compensating for laser power variations.

6. A method of optically measuring the percent of open area in a perforated sheet, the steps comprising:
    directing a light outwardly from a quasi-monochromatic light source;
    collimating the light received from the light source;
    positioning the perforated sheet in front of the collimated light and passing the collimated light therethrough;
    receiving the light passed through the perforated sheet on and through a light diffraction optical lens;
    receiving diffracted light from the light diffraction optical lens on and through a relay magnifying optical lens;
    receiving magnified diffracted light from the relay magnifying optical lens on a light diffraction aperture plate, the size of the aperture in the light diffraction aperture plate small enough for passing only a small central portion of the diffracted light therethrough;
    detecting the small central portion of the diffracted light passing through the aperture in the light diffraction aperture plate with a first light detector; and
    electrically measuring with electronic means the amount of defracted light of the small center portion received by the first light detector and converting electronically this amount to a percent of open area in the perforated sheet.

7. The method as described in claim 6 wherein the light source is a laser.

* * * * *